(12) United States Patent
Lecourtier

(10) Patent No.: US 6,988,157 B2
(45) Date of Patent: Jan. 17, 2006

(54) HOT INSERTION OF A SERVICE PROCESSOR CARD IN A SYSTEM

(75) Inventor: Georges Lecourtier, Versailles (FR)

(73) Assignee: Bull S.A., Louveciennes (FR)

( * ) Notice: Subject to any disclaimer, the term of this patent is extended or adjusted under 35 U.S.C. 154(b) by 415 days.

(21) Appl. No.: 10/254,520

(22) Filed: Sep. 26, 2002

(65) Prior Publication Data

US 2003/0059746 A1    Mar. 27, 2003

(30) Foreign Application Priority Data

Sep. 26, 2001 (FR) .................................. 01 12353

(51) Int. Cl.
*G06F 13/00* (2006.01)

(52) U.S. Cl. .................................................. 710/302

(58) Field of Classification Search ........ 710/301–304; 361/679–822
See application file for complete search history.

(56) References Cited

U.S. PATENT DOCUMENTS

| | | | |
|---|---|---|---|
| 4,079,440 A * | 3/1978 | Ohnuma et al. ............ 361/816 |
| 4,200,865 A | 4/1980 | Morioka et al. |
| 5,210,855 A | 5/1993 | Bartol |
| 5,384,492 A * | 1/1995 | Carlson et al. ............. 307/147 |
| 5,432,916 A * | 7/1995 | Hahn et al. ................. 710/302 |
| 5,568,610 A * | 10/1996 | Brown ......................... 714/48 |
| 5,644,731 A * | 7/1997 | Liencres et al. ............ 710/302 |
| 5,754,797 A * | 5/1998 | Takahashi ................... 710/302 |
| 5,796,185 A * | 8/1998 | Takata et al. ............... 307/140 |
| 5,898,844 A * | 4/1999 | Thompson .................. 710/302 |
| 5,951,660 A * | 9/1999 | Van Wonterghem ........ 710/302 |
| 5,973,419 A * | 10/1999 | Kruppa et al. .............. 307/131 |
| 6,026,458 A * | 2/2000 | Rasums ....................... 710/302 |
| 6,125,417 A * | 9/2000 | Bailis et al. ................. 710/302 |
| 6,141,711 A * | 10/2000 | Shah et al. .................. 710/302 |
| 6,154,798 A | 11/2000 | Lin et al. |
| 6,182,173 B1 * | 1/2001 | Grosser et al. ............. 710/302 |
| 6,192,435 B1 * | 2/2001 | Takahashi .................... 710/302 |
| 6,449,676 B1 * | 9/2002 | Johari et al. ................ 710/304 |
| 6,573,620 B1 * | 6/2003 | Craig et al. ................. 307/147 |
| 6,591,324 B1 * | 7/2003 | Chen et al. ................. 710/302 |
| 6,718,415 B1 * | 4/2004 | Chu ........................... 710/301 |

(Continued)

FOREIGN PATENT DOCUMENTS

EP        490010 A1 *   6/1992

(Continued)

*Primary Examiner*—Paul R. Myers
*Assistant Examiner*—Ryan Stiglic
(74) *Attorney, Agent, or Firm*—Miles & Stockbridge P.C.; Edward J. Kondracki

(57) ABSTRACT

The method of management of the hot insertion of an electronic card (11) in a system (10) comprises the successive connection of the card to two supply potentials (U0, Ui) available in a connector (20) so as to obtain transient connection signals (41, 42) during the hot insertion of the card, the detection of the transient signals for providing a binary signal (Vi), one binary state (Vi=1) of which represents the hot insertion of the card, and the use of said state of the binary signal (Vi) for rendering the card operational in the system. The hot insertion detector (37) includes a bistable logic circuit fed during the connection of the card to said potentials and provided with biasing means adjustable depending on the presence or otherwise of the transient signals.

10 Claims, 3 Drawing Sheets

U.S. PATENT DOCUMENTS

| | | | |
|---|---|---|---|
| 6,718,472 B1 * | 4/2004 | Garnett | 713/300 |
| 6,766,394 B1 * | 7/2004 | Shimura et al. | 710/100 |
| 2002/0169913 A1 * | 11/2002 | Heizer et al. | 710/302 |
| 2003/0005200 A1 * | 1/2003 | Kumar et al. | 710/302 |
| 2003/0097507 A1 * | 5/2003 | Lin | 710/302 |

FOREIGN PATENT DOCUMENTS

| | | | |
|---|---|---|---|
| EP | 0 752 668 A | | 1/1997 |
| JP | 04037194 A | * | 2/1992 |

* cited by examiner

HOT INSERTION OF A SERVICE PROCESSOR CARD IN A SYSTEM

TECHNICAL FIELD

The present invention relates to the hot insertion of an electronic card, and specifically a service processor card, in a system. Hot insertion is when a card in a live, operational system is added or replaced during the functioning of the system. This function is known in the English-language literature under the terms "hot-plug" or "hot-swap".

The principal subject of the present invention is a method of management of the hot swap of a service processor card in a system. Its corollary subjects are a detector for detecting the hot swap of a service processor card in a system, and also a card and a system employing the detector and/or the management method according to the invention.

The invention is adapted in particular to a card incorporating at least one microprocessor in an information technology or telecommunications system and more particularly to such a card for administering the system.

THE PRIOR ART

At present, the users of data processing or telecommunications systems increasingly often demand to be able to carry out a hot swap of an additional card or a replacement for a defective card. Without this function, the system must be shut down and reset. The shut down is often extremely damaging for the proprietor and the users of the system. Moreover, shutting down and resetting are operations for which it is necessary to have recourse to specialists and which are costly in both time and money. An example will first be given of a hot swap in a small system, such as a personal computer or an information technology server, then in a large system, the difficulties of which will clearly emphasise the features and advantages of the present invention.

A current method for a hot swap in a small computer is the changing of a daughter board connected to a mother board. At present, in this type of computer the daughter board is ordinarily a PCI (Peripheral Component Interconnect) card representing an input/output controller connected to the system by a PCI bus. The hot swap device comprises electronic switches mounted on the mother board and acting on each of the interface signals and on each of the power supplies of the daughter board. The method for management of the hot swap begins by actuating these switches so as to completely isolate, from the electrical standpoint, the mother board from the daughter board during the crucial operations of withdrawal or insertion of the daughter board. The electronic switches are operated by the central processor or the maintenance processor for the system which are assumed to be in normal activity during the whole of the hot swap procedure. This insertion device functions conveniently for input/output cards of the system such as PCI cards or line cards of the telecommunications systems. In this case, according to the insertion method, the operating system of the computer first carries out the operations of logical disconnection of the resources associated with the input/output devices connected to the daughter board or boards, isolation of the faulty board and indication of the malfunction to the maintenance engineer, then, following the physical exchange of the daughter board or boards, the operations of re-energising, initialisation of the daughter board or boards, resetting of the drivers and finally the restoration of the resources in the tables of the system.

The system which will serve as an example is a large computer made up of a mother board to which is connected at least one operating daughter board fulfilling the functions demanded by a user, such as information technology and/or telecommunications functions, and a management daughter board for managing the mother board and operating daughter boards. The management board includes at least one microprocessor and physical and/or software means for receiving the data from the other boards and emitting the control signals required for the administration of the system. The management board constitutes a service processor for the system. The service processor does not rely on the physical resources of the main system, in particular the processors of the system which are assigned to the user. It is therefore capable of carrying out the operations of reconfiguration and rebooting without immediate human intervention. The service processor is connected outside the system to at least one computer constituting an administration processor and a user graphics interface that can be local or remote for telemaintenance. This administration processor manages the resources of the system by way of at least one service processor, which serves as administration agent of the system and constitutes a low level element of the administration. Customarily, messages verifying correct operation are regularly exchanged between the service processor and the processor(s) of the system and/or at least one remote administration processor of the system. The administrator user of the system or the maintenance engineer can thus be warned of any malfunction by messages transmitted automatically by the service processor, which state the identification number of the system and the type of board involved. At a later moment, from a few minutes to a few hours later, the hot swap of a new board is executed to restore the integrity of the system and thus prevent multiple breakdowns from making it obligatory to stop operation.

A first problem arises when the service processor itself is defective. As a general rule, the functioning of the service processor is not indispensable to the operation of the system by its users. But as its link with the administration processor makes it possible to detect easily if it is defective, it would be regrettable to have to stop operation of the user system for the entire duration of the unavailability of the service processor. The hot swap of a service processor poses a second problem when it is done according to a conventional method of hot swap of any other electronic card constituting an operating processor in the system. After the hot swap, the normal re-energising of the service processor leads, depending on its initial configuration, to shutdown of the power supplies of the system and to the initialisation of the operating processors, the memory sub-systems and input/output cards. This problem therefore manifests itself in abrupt interruption of the operation of the information technology system. Taking into account these two problems, this case will be taken as an example to illustrate the invention.

SUMMARY OF THE INVENTION

The first object of the invention is a method of management of the hot swap of a card in a system, which avoids costly redundancy of the equipment of the card and of the access routes to all the management buses of the system.

A second object of the invention is to adapt the method to a management board for managing the system, without the risk of blocking the functioning of the rest of the system.

A third object of the invention is to be able to implement the method in a simple, inexpensive and reliable manner.

The subject of the invention is a method of management of the hot swap of an electronic card in a system, comprising the successive connection of the card to two supply potentials available in a connector so as to obtain transient connection signals during the hot swap of the card, the detection of the transient signals for providing a binary signal, one binary state of which represents the hot swap of the card, and the use of said state of the binary signal for rendering the card operational in the system.

A further subject of the invention is a detector for detecting the hot swap of an electronic card in a system, characterised in that it comprises means for successive connection of the card to two supply potentials available in a connector so as to obtain transient connection signals during the hot swap of the card and a bistable logic circuit fed during the connection of the card to said potentials and provided with biasing means adjustable depending on the presence or otherwise of the transient signals, in order to initialise the bistable logic circuit in a first logic state when the card is mounted on the connector during a cold reset of the card and in the second logic state in response to the transient signals during the hot swap of the card.

A corollary subject of the invention is an electronic card comprising means for connection of the card to two supply potentials external to the card and means for the hot swap of the card in a system which have the functions defined by the method of the invention or comprise a detector for detecting the hot swap as defined previously.

A further corollary subject of the invention is a system in which at least one card can be hot swapped and which implements the method of the invention.

The features and advantages of the invention are clearly revealed by the following description, provided by way of example and prepared with reference to the appended drawings.

PRESENTATION OF THE DRAWINGS

DETAILED DESCRIPTION OF EXAMPLES ILLUSTRATING THE INVENTION

Figure 1:
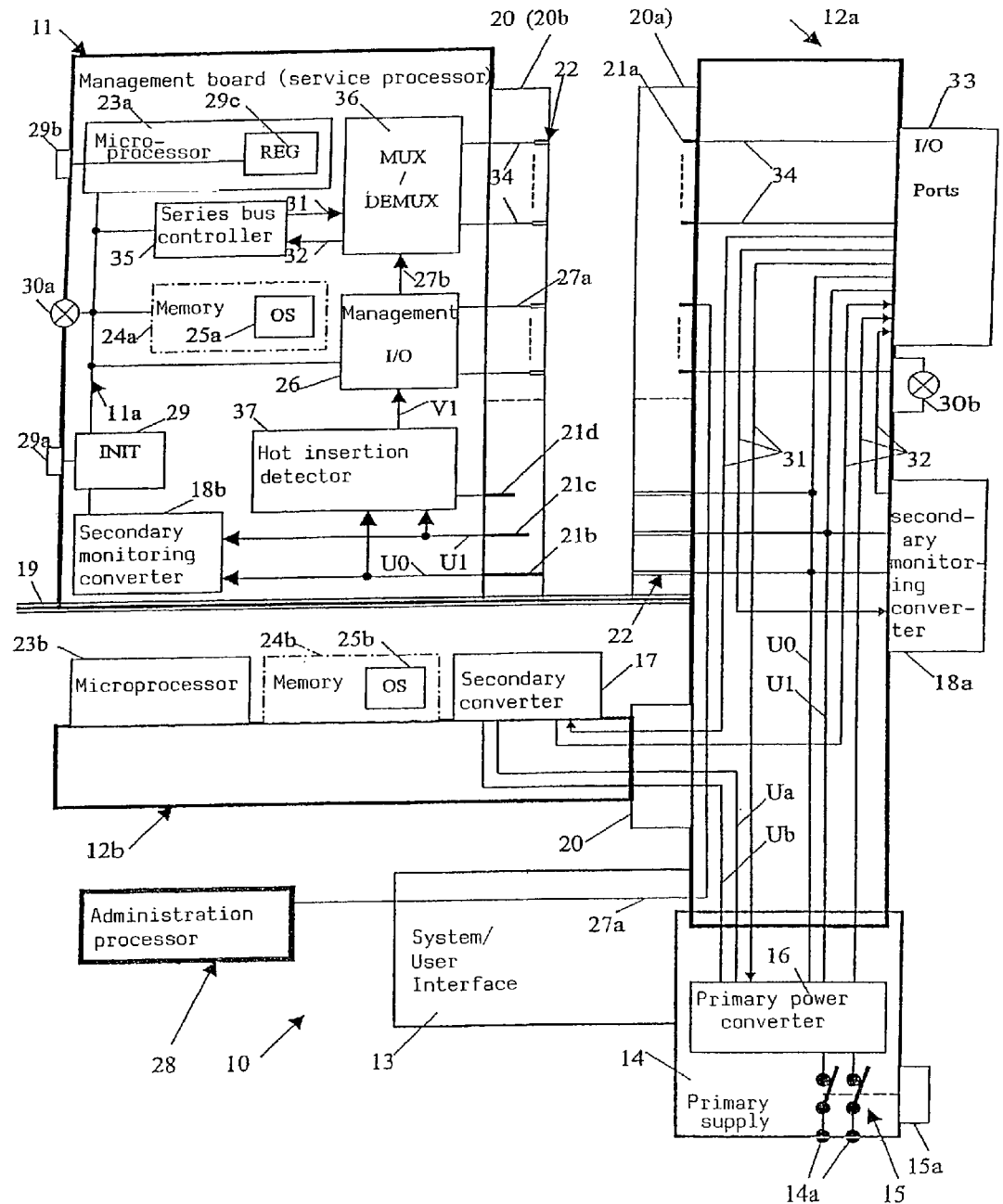
FIG. 1 is a partial diagrammatic view of a structure seen from the side of a system implementing the method of the present invention provided for the management of the hot swap of the management board of the system.

FIG. 1 is a diagrammatic side view of the structure of a large information technology system 10. The system selected is all or part of an information technology system or a telecommunications system, in which case it is often termed a platform. The platform 10 comprises a management board 11 for managing at least one operating board 12, that is to say, a mother board 12a and a daughter board 12b in the example illustrated. The daughter board 12b serves as central unit. Other daughter boards, not illustrated for the sake of simplification of the drawings, may constitute the central unit and/or other units, such as an input/output unit. The management board 11 of the platform 10, also termed PMB board (Platform Management Board) or service processor, is also a daughter board for the mother board 12a. Within the framework of the present description, the presence of the management board 11 means that the platform 10 is a large system.

The mother board 12a is also connected to an interface 13 between the system 10 and a user of the system, and to a primary electric power supply block 14 of the platform 10. The electric power is received at input terminals 14a of the block 14 and is transmitted, by way of a switch 15 with button 15a for general start/stop control of the platform, to a primary electric power converter 16. The converter 16 supplies a primary supply voltage made up of potentials Ua, Ub, in this instance Ua=0 volt constituting the electrical earth of the platform and Ub=48 volts. The voltage Ua, Ub is applied, under the conventional control (not illustrated for the sake of clarity of the drawings) of the management board 11, to a secondary supply converter 17 disposed on the operating board 12b for supplying the supply voltages necessary for the functioning of its components. In practice, the daughter board 12b and the other operating daughter boards, not shown, of a large information technology system consume a high power, in this instance of the order of 5000 watts. The converter 16 continuously supplies a monitoring supply voltage U0, U1, in this instance U0=Ua=0 volt and U1=12 volts, to two secondary monitoring converters 18a and 18b disposed respectively on the mother board 12a and on the management board 11 for supplying the voltages necessary for the functioning of the components of the respective boards 12a and 11. The monitoring power is low, of the order of 50 watts.

The mother boards 11 and 12b may be slid on rails 19 (only the rail relating to the board 11 is illustrated) in order to be connected to the mother board 12a by insertion into respective electrical connectors 20. The connectors illustrated are of the backpanel type (backpanel connector). The management board 11 is shown in a state not connected to the mother board 12a in order to show up the structure of the connector 20. The connector 20 consists of a connection piece 20a rigidly connected to the mother board 12a and a connection piece 20b rigidly connected to the management board 11. The piece 20a has a male part for the connection of the logic signals with a corresponding female part of the piece 20b. The piece 20a also has a female part for the transmission of the supply potentials U0 and U1 to a corresponding male part of the piece 20b. The male parts carry conductive pins 21 disposed in correspondence with respective female electrical contacts 22. In a conventional manner, the insertion of the board 11 or 12b into the corresponding connector 20 is effected by pins 21 of different lengths in order to obtain a sequential connection determined during the insertion of the board. In the example of the board 11 illustrated, the pins 21 comprise: pins 21a which are assigned to the logic signals entering or leaving the board 11 and which are ordinarily of standard size, fine and very short; at least one earth pin 21b, thicker than the pins 21a and very long in order to ensure that the earth potential U0 will be the first connection during the insertion of the board 11 and the last disconnection during the withdrawal of the board 11; and at least one voltage pin 21c, shorter and ordinarily of the same thickness as the earth pin 21b and assigned to the potential U1. In practice, each connector 20 ordinarily carries an earth pin 21b (and optionally a voltage pin 21c) at each of its ends, so as to ensure more fully that at least one of the two pins 21b is in contact with earth before any connection of the other pins 21a and 21c during the insertion of the board into the connector and remains last in contact with the earth during withdrawal of the board. For the sake of clarity of the drawings, a single earth pin 21b and a single voltage pin 21c are illustrated. In the connector 20 assigned to the management board 11, the piece 20b also comprises at least one short pin 21d, shorter than the voltage pin 21c, but longer than the logic signal pins 21a. In the piece 20a, the female contact 22 associated with the short pin 21d is connected to the earth U0.

The daughter boards 11 and 12b illustrated are each equipped with at least one respective microprocessor 23a and 23b. The mother board 12a may also have one. More generally, for a large information technology system it is sufficient for there to be a service microprocessor 23a in the management board 11 and an operating microprocessor 23b in one of the other boards 12. The daughter boards 11 and 12b contain respective memory means 24a and 24b connected to the respective microprocessors 23a and 23b. The mother board 12a may also contain one. The memory means 24a, 24b are represented by a phantom line to indicate that in reality they are provided to contain all the software means employed in the corresponding board. In particular, the memory means 24a contain a specialised operating system 25a for management, while the memory means 24b of the operating board 12b contain a specialised operating system 25b for the processing demanded by a user.

In the management board 11, the microprocessor 23a is connected to a bus 11a internal of the board 11 and providing the local exchanges of the address, control and data signals. The microprocessor 23a is connected by the bus 11a to a block 26 for managing the inputs/outputs of the board 11 by way of the pins 21a and corresponding contacts 22. In particular, it communicates, by way of links 27a (only one being illustrated by way of example) and of the interface 13, with a local or remote administration processor 28 (such as a personal computer) of the platform 10, which allows a user, administrator of the platform 10, to receive the administration data generated by the board 11 and consequently emit the administration and maintenance commands. In the management board 11, the microprocessor 23a is also connected to a block 29 for initialisation of the board 11. The initialisation block 29 also has an input for receiving the supply potentials of the secondary monitoring converter 18b. The initialisation block 29 is connected to a cold reset device 29a, corresponding to a normal reset after complete and regular shutdown of the board 11, and, by way of the microprocessor 23a, to a device 29b for warm reset of the board 11. The device 29b ordinarily has a physical part in the form of a control button for the use of a user for interrupting the functioning of the board 11 and a software part for the warm reset. It is also connected to a reset status register 29c incorporated in the microprocessor 23a and the content of which will be termed REG. The device 29a has no physical control button. However, the two devices 29a and 29b have been shown in FIG. 1 in the form of buttons to suggest their function.

In the board 11, the microprocessor 23a is also connected to a device 30a for detecting and warning of a breakdown of the functioning of the board 11. The device 30a selected and illustrated is an assembly of electroluminescent diodes disposed on the front face of the board 11, which emits for example a flashing light in normal operation and which stops flashing when the operating system 25a of the board 11 can no longer function correctly. The device 30a may also be provided on the interface 13. The shutdown of the operating system 25a may also be alternatively or conjointly detected by way of the management block 26, by a watchdog timer 30b located externally of the management board 11, in this instance on the mother board 12a. The triggering of the watchdog timer 30b allows the administrator to be warned of any malfunction by a signal, in this instance luminous like the device 30a, placed on the mother board 12a or on the interface 13, and allows the platform 10 to pass into a degraded function mode. For example, the degraded mode may command the cooling system to pass to maximum operation, permitting the thermal protection of the circuits of the system at the simple expense of a higher acoustic level than in normal operation.

A first function of a management board is to send to the secondary converters 17 and 18 supply status control signals 31 which in particular determine the shutdown status and various states of functioning representing values of the supply potentials which the secondary converters 17 and 18 should supply. The control signals 31 are generated by the service processor 23a and are stored conventionally in the block 26. A second function of a management board is to receive and store supply status signals 32 generated by the secondary converters 17 and 18. The status signals 32 represent states of functioning of the corresponding converters 17 and 18 and allow the management board to verify whether they are functioning correctly and, in the case of malfunction, to alert the administration processor 28. In a conventional board 11, the signals 31 and 32 are currently stored in the block 26 in input/output ports in the form of CMOS(Complementary Metal-Oxide-Silicon) integrated circuits.

In the management board 11 according to the invention, the status control signals 31 and the status signals 32 are stored externally of the board. In particular, the signals 31 are stored in a block 33, in this instance disposed on the mother board 12a. In addition, the block 33 is supplied with electric power by the continuous monitoring potentials U0, U1 which are supplied by the primary converter 16 and safeguard the signals 31 and 32 when the board 11 is disconnected from the mother board 12a and/or in the event of cut-off of the potentials Ua and Ub. In the block 33, the input/output ports of the example selected bear the reference PCF 8574 and are described in the document 9397-750-01758 of the company Philips. These ports have the advantage of consuming little power, of not being bulky and of permitting easy distribution of the signals 31 and 32. The signals 31 and 32 transit between the block 33 and the management board 11 by way of series data transmission links 34. The links 34 are constituted in the example illustrated by bus segments known under the name 12C™ (Inter-Integrated Circuit) of the company Philips Semiconductor, used for connecting integrated circuits. This bus has a clock wire and a wire for the bidirectional exchange of data. However, for the sake of clarity of the description and for the generality of the invention, the signals 31 and 32 illustrated transit on different wires. The supply status commands defined by the microprocessor 23a are applied to an I2C series bus controller 35, which consequently transmits the status control signals 31 by the series links 34 to the block 33 by way of a multiplexer/demultiplexer block 36 controlled by the block 26 by way of a group of signals 27b. The block 36 also receives the status signals 32 and transmits them to the controller 35. Other types of bus currently used in the areas of industrial information technology cards may also be applied. Links 34 also serve to transmit the signals 31 and 32 between the block 36 and the secondary power converter 17. Finally, the board 11 incorporates a detector 37 for detecting the hot swap of the management board 11.

Figure 2:
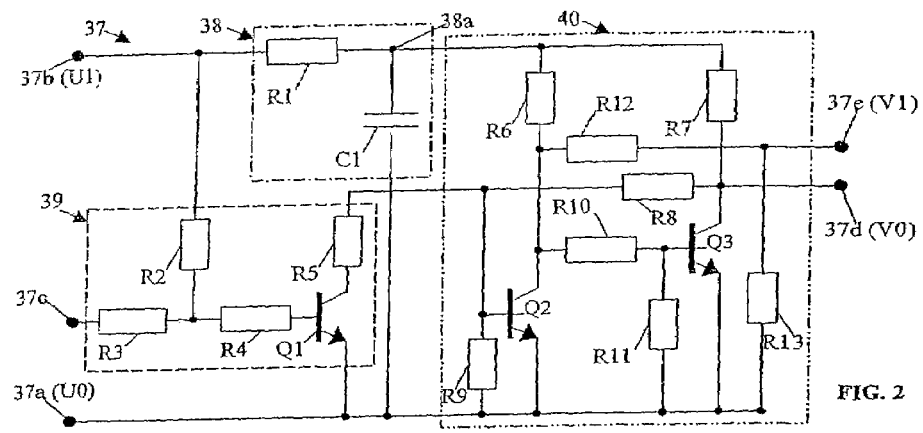
FIG. 2 is a diagrammatic view of the electric circuit of an example of a hot insertion detector that can be employed by the method of the invention.

FIG. 2 illustrates an example of a circuit constituting the detector 37. The detector 37 is included in the board 11 and has three input terminals 37a, 37b and 37c connected respectively to the three pins 21b, 21c and 21d. The input terminals 37a and 37b represent respectively the earth potential U0 and supply potential U1. The detector 37 delivers to two output terminals 37d and 37e two respective output voltages V0 and V1. Only the output terminal 37e supplying the signal V1 is used and is applied to the input of the management block 26 for managing the inputs/outputs of the board 11. The other output terminal 37d and its output signal V0 serve only to illustrate the functioning of the detector 37. The input terminal 37b is connected to a low-pass filter 38 formed by a resistor R1 in series with a capacitor C1 connected to earth. The junction R1-C1 constitutes the output terminal 38a of the filter 38. The input terminal 37c is connected to an input stage 39 comprising a bipolar transistor Q1 and four resistors R2–R5. The input terminals 37b and 37c are connected to each other by way of the two resistors R2 and R3 in series. The transistor Q1 has its base connected by the resistor R4 to the junction of the resistors R2 and R3, its emitter is earthed and it collector is connected to a first end of a resistor R5. The detector also includes a bistable logic circuit 40 connected to the output terminal 38a of the filter 38 and to the input stage 39 and constituted by two bipolar transistors Q2 and Q3 having their emitters to earth. The three transistors Q1–Q3 are of the NPN type, for example those listed as 2N2222. The collectors of the transistors Q2 and Q3 are connected by two respective load resistors R6 and R7 to the output terminal 38a of the low-pass filter 38. The base of the transistor Q2 is connected to the second end of the resistor R5 and to the junction of two resistors R8 and R9 mounted in series between the collector of the transistor Q3 and earth. The base of the transistor Q3 is connected to the junction of two resistors R10 and R11 mounted in series between the collector of the transistor Q2 and earth. The potential at the collector of the transistor Q3 is applied to the output terminal 37d and delivers an output potential V0 of the bistable logic circuit 40 and the detector 37. The output terminal 31e of the detector 31 is connected to the junction of two resistors R12 and R13 mounted in series between the collector of the transistor Q2 and earth and supplies an output potential V1 of the detector 37. In the exemplary embodiment, the values of the resistors (in decreasing order) and of the capacitance of C1 are as follows:

| | |
|---|---|
| R12 = 100 kΩ | R13 = 47 kΩ |
| R9 = RiO = 22.1 kΩ | R4 = R6 = R7 = R8 = R11 = 10 kΩ |
| R2 = R5 = 4.75 kΩ | R1 = 100 Ω |
| R3 = 47 Ω | C1 = 10 μF |

Figure 3:
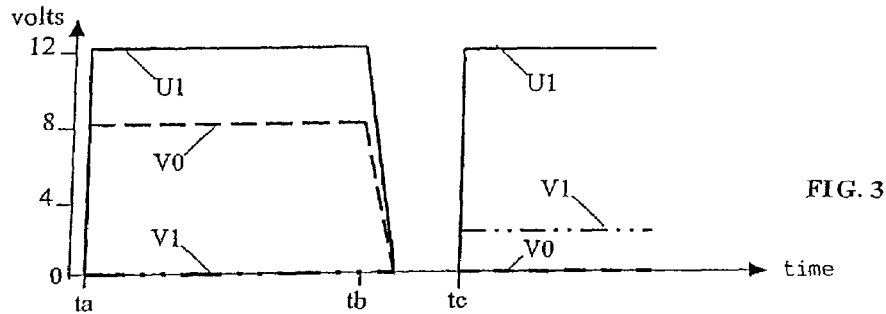
FIG. 3 is a graph illustrating two operating modes of the detector shown in FIG. 2.

FIG. 3 is a graph in which the axis of the abscissae represents the time t and the axis of the ordinates represents potentials in volts, shown by thick lines and relating to the detector 37, that is to say, the potential (solid line) at the input terminal 37b and the potentials V0 (dashed line) and V1 (phantom line) at the respective terminals 37d and 37e. Before a moment ta, the normal case considered is that in which the platform 10 is in the complete shutdown state (switch 15 is open) and the boards 11 and 12b are connected to the mother board 12a. At the moment ta, the platform 10 is set in operation by actuation of the button 15a to close the switch 15. The input terminals 37a and 37c take the potential U0 (earth) and the input terminal 37b takes the high potential U1, of 12 volts in the example under consideration. This case corresponds to a cold reset of the management board 11. At the moment ta, the potentials at the input terminals 37c and 37b are directly U0 and U1. The ratio of the values of the resistors R2/R3 between the terminals 37b and 37c is in this instance equal to 100 and means that the potential at the base of the transistor Q1 is very much below the base-emitter voltage threshold (ordinarily of the order of 600 millivolts) necessary for triggering the conduction of a bipolar transistor. The transistor Q1 is therefore still maintained in the blocked state and no current flows in the resistor R5. The polarisation of the transistor Q2 is therefore only supplied by the resistors R7, R8 and R9, while the polarisation of the transistor Q3 is supplied by the resistors R6, R10 and R11. The bistable logic circuit 40 is of conventional design, of the RS type (Reset, Set). It should be noted that if the transistors Q2 and Q3 had the same polarisation potentials, the bistable logic circuit 40 would be symmetrical. In this case, the initial state that would be assumed by the complementary values of the voltages V0 and V1 would be indeterminate during a cold reset. For example, the logic state of V0 could be 0 or 1, and no prediction could be made. In the bistable logic circuit 40 illustrated in FIG. 2, the value of the resistor R9 (22.1 kΩ) is higher than that of the resistor R11 (10 kΩ), so that the transistor Q2 reaches its conduction threshold before the transistor Q3. The bistable logic circuit 40 is therefore initialised in the logic state 1 of the potential V0, which corresponds to the value 8 volts in FIG. 3, while the potential V1 remains that of earth. In other words, the asymmetry of the polarisations which is caused by different values of the resistors R9 and R11 determines the initial state of V0 at the logic state 1 during a cold reset of the board 11.

With reference to FIG. 3, it is now assumed that a malfunction of the management board 11 is signalled to the administrator by at least one of the warning devices 30a, 30b. At a moment tb, the defective board 11 is disconnected, so that the potentials U1 and V0 drop.

To proceed with the withdrawal of the board 11, no particular procedure has to be carried out. It is sufficient to disconnect the board 11 from the back of the panel 20a. If the breakdown affects the power supply to the board 11, safety means internal to the board 11 cut off the arrival of the power and the board is regarded as de-energised. The supply status control signals 31 are stored in the block 33, the power source of which is independent of the rest of the circuits of the board 11 and are not therefore affected by the shutdown of the power supply of the board 11. The supply status signals 32 are stored in the converters 16, 17 and 18a. If the breakdown affects a logic circuit or a memory of the board 11, the microprocessor 23a can be put into a dead-lock state as a result of the breakdown or of a command from the operating system 25a or, if the microprocessor 23a is active, the operating system 25a may have chosen to stop the execution of the kernel. In these two cases, making safe is carried out in the manner already described. At the moment of withdrawal of the board 11, the successive connection of the pins suffices to cut off properly the power supply of the board 11. On the other hand, electronic switches (not shown) could be installed on the mother board 12a to ensure logical isolation of the board 11 with respect to the other circuits during the insertion phase, as described in the introduction of the present application. After the hot swap of the board 11, the operating system 25a would command the closure of these switches when the initialisation state of the board permitted it.

It is assumed that at a moment tc a new board 11 is hot swapped into the connector 20. The potentials illustrated are diagrammatic and their ratios do not represent reality, FIGS. 4A–4C serving only by way of example for an expert in the field. The insertion of the new board 11 at the moment tc begins with the connection of the long pin 21b to the earth potential U0. At the moment tc, the input terminal 37a of the detector 37, which is connected to the earth pin 21b, therefore takes the earth potential U0.

Figure 4A:
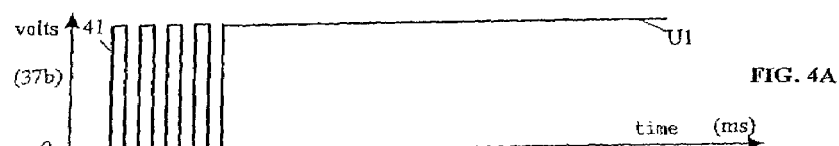
FIGS. 4A–4D are graphs illustrating waveforms present at different points of the detector shown in FIG. 2 during the hot swap of the management board.

FIGS. 4A–4D are graphs in which the axis of the abscissae represents the time in milliseconds (ms) and the axis of the ordinates represents potentials (in volts) relating respectively to the terminals 37b, 38a, 37c and 37d, 37e of the detector 37 shown in FIG. 2. For the sake of simplicity of the drawings, the waveforms illustrated do not observe the real values but suffice to allow an expert in the field to understand the functioning of the detector 37. The insertion of the board 11 is effected ordinarily by sliding the board 11 by hand along the rail 19. The speed of insertion is therefore slow, for example of the order of a few millimetres per millisecond. Consequently, at a moment td very close to the moment tc, the medium pin 21c enters the corresponding contact 22 representing the potential U1. The potential of the medium pin 21c is established at the potential U1 at a moment te. As shown in FIG. 4A, the period [td, te] is known under the name of transitory period of establishment of potential, during which transient signals 41, in the form of wide amplitude interference oscillations, appear at the terminal 37b. For the sake of simplicity of the drawings, FIG. 4A indicates only the presence of these oscillations without taking into account their values in relation to the potential U1.

Figure 4B:
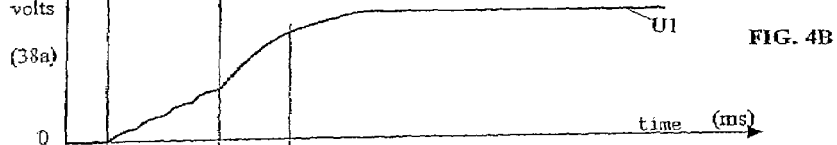

During the period [td, te], the transient signals 41 are filtered by the filter 38, the time period of which is selected as 1 ms, as shown in FIG. 4B. The filter 38 ensures that the supply potential U1 of the bistable logic circuit 40 will not be disturbed so as to impair the establishment of the initial state of the bistable logic circuit 40 during hot connection. In FIG. 4B, it can be seen that the potential supplied to the bistable logic circuit 40 increases substantially linearly from 0 volt to a value below that of the potential U1 during the period [td, te] and, according to an exponential curve, attains the value U1 at a moment close to the moment te.

Figure 4C:
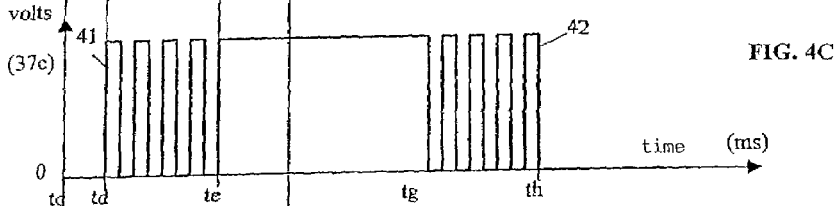

FIG. 4C illustrates the waveform of the potential at the input terminal 37c of the detector 37. During the period [td, te], the input terminal 37c is not yet connected. Consequently, the potentials at the terminal 37c and at the base of the transistor Q1 follow the potential of the terminal 37b in ratios determined by the resistors R2 and R4 and by the input impedance of the transistor Q1. In particular, the potential of the terminal 37c is about equal to half that of the terminal 37b in the example selected. The transistor Q1 therefore conducts substantially at the same beat as the oscillations 42. After the moment te, the terminal 37c is not yet connected to the earth potential and the potential is therefore established at a value substantially equal to half the potential U1 of the terminal 37b. The transistor Q1 is therefore also established in its conductive state.

Figure 4D:
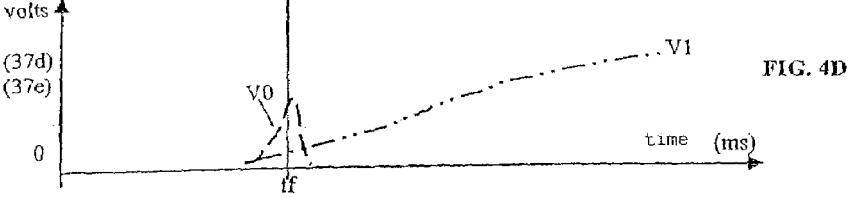

FIG. 4D illustrates the variations of the potentials at the output terminals 37d and 37e. After the moment te, the conduction of the transistor Q1 and the increase in the potential at the terminal 38a mean that the bistable logic circuit 40 begins to be initialised. It can be seen in FIG. 4D that the potential V0 starts by increasing as from the moment ta, and it increases as long as the conduction thresholds of the transistors Q2 and Q3 are not reached. The current which flows in the resistor R5 lowers the potential at the base of the transistor Q2 below the potential at the base of the transistor Q3. At a moment tf, the potential V0 drops while the potential V1 continues to be established at its logic state 1. The moment tf therefore corresponds to the locking of the bistable logic circuit 40 in the initial logic state (V0=0, V1=1) corresponding to the hot swap of the board 11.

By continuing to push the board 11 for its insertion into the connector 20, the short pin 21d enters the corresponding contact 22 to connect to the earth potential U0 at a moment tg. At the moment tg, the connection of the short pin 21d to earth creates transient signals 42 (see FIG. 4C) during a transitory period of establishment of potential of the terminal 37c towards the earth potential U0. The transient signals 42 are of the same kind as the transient signals 41 illustrated in FIG. 4A. The oscillations of the transient signals 42 are applied to the base of the transistor Q1 at the moment tg which is later than the moment tf of locking of the initial state of the bistable logic circuit and can no longer act on this locking. The polarisation conditions of the transistors Q2 and Q3 guarantee that the collector current of the transistor Q1 no longer allows the state of the bistable logic circuit to be modified. At a moment th shown in FIG. 4C, the transient signals 42 terminate and the input terminal 37c is established at the earth potential, so that the transistor Q1 is definitively blocked while the bistable logic circuit 40 is established at its initial state corresponding to the logic state 1 of the output potential V1, which is around 3 volts in the example illustrated in FIG. 3. The potential V1 is applied to the block 26 to permit the operating software 25a to initialise the board 11, depending on whether the board 11 has been hot swapped or not.

It should be noted that the moment of locking tf of the bistable logic circuit 40 should precede the moment tg of electrical connection of the short pin 21d to the corresponding earth contact 22. It will be understood that if tf>tg, the transistor Q1 would no longer conduct continuously and the bistable logic circuit 40 would assume its predetermined initial state, as during the period [ta, tb]. The duration [tf, tg] is included in the duration [td, tg]. The moment tf could occur before the moment te if the base current of the transistor Q1 was filtered so that the current in its collector is not cancelled out during the duration [td, te]. The duration [td, tg] is determined in particular by the speed of movement of the board 11 on its rail 19 and by the difference in length between the medium pin 21c and the short pin 21d. In the example selected, the difference in length between pins is 2 mm, and as the normal movement is around 0.5 metres per second, the duration [td, tg] is of the order of 4 ms. The connection of the logic pins 21a takes place last and may also create transient interference signals. Preferably, during the insertion of the board, the functioning of the multiplexer block 36 is predetermined to be blocked by the signals 27b coming from the block 26 in order to prevent it from receiving interference signals during the connection of the board.

Figure 5:
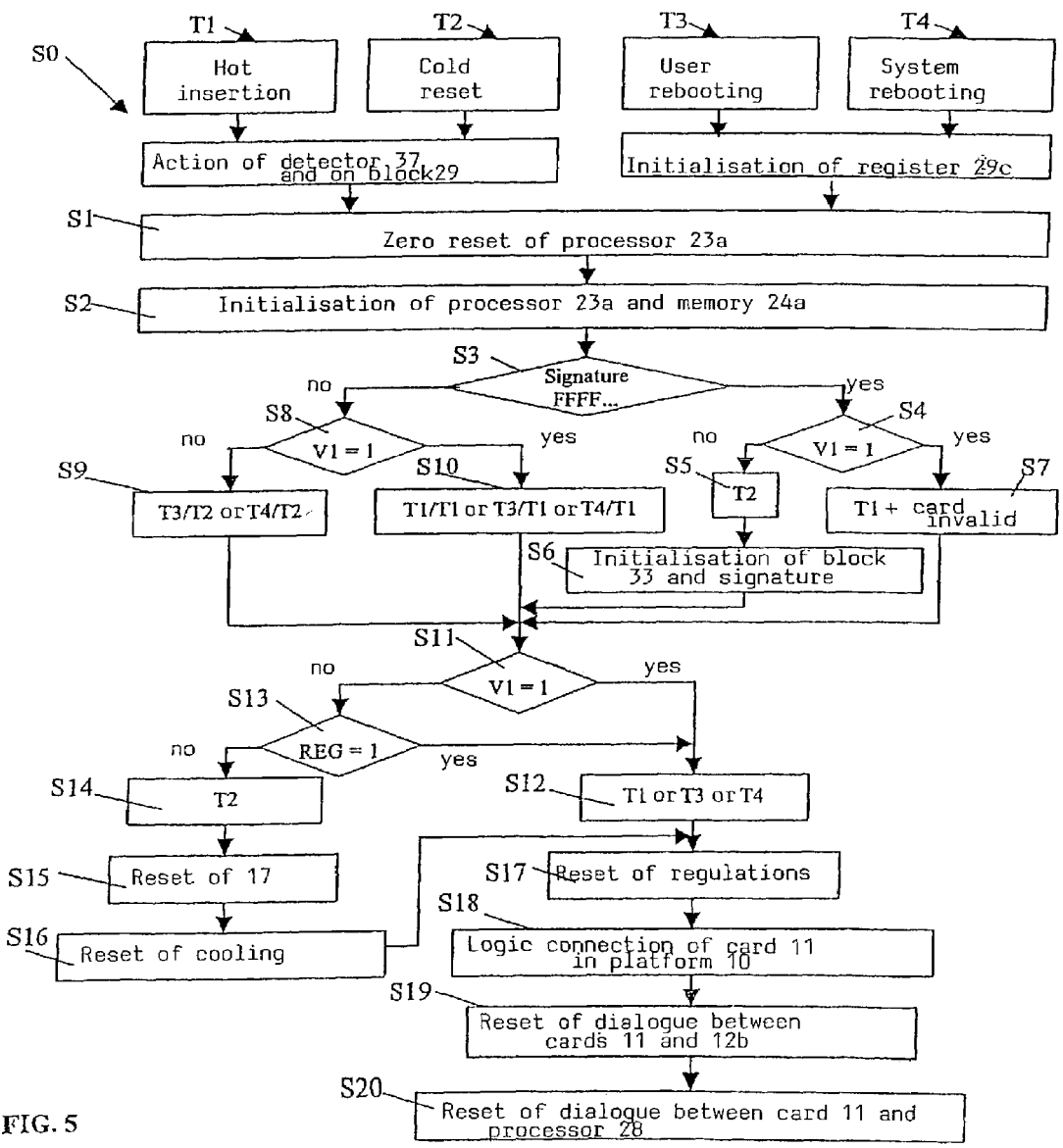
FIG. 5 is a flow chart illustrating an example of a method of initialisation of the management board that can be employed by the method of the invention.

FIG. 5 is a flow chart illustrating an example of an initialisation method that can be implemented by the management board 11. The method illustrated begins with a step S0 comprising four transitions T1–T4. The transition T1 corresponds to the hot swap of the board 11 and the three ordinary transitions T2, T3, T4 correspond to the three resets currently provided for any platform. The transition T2 corresponds to the cold reset of the board 11 in the platform 10, like that described with reference to FIG. 3 starting from the moment ta. The transitions T1 and T2 are recognised by the detector 37 and the executable code which is dedicated to it in the operating system 25a. The transitions T1 and T2 also have an action on the initialisation block 29 by way of the secondary monitoring converter 18b. The block 29 may be a conventional circuit. In the example selected, the block 29 is a type TLC7733 case of the company Texas Instruments. This is principally a timer which, during the stabilisation time of the supply converter 18b (customarily a few tens or hundreds of milliseconds), forces into the low state the zero reset signal of the board 11, which forms part of the control signals circulating on the bus 11a. The particular feature of the circuit selected is that it is calculated so as to function reliably during the transient signals 41 of its own power supply 18b. On the other hand, the transition T3 is produced at the request of a user for rebooting of the platform, ordinarily by pressing the warm reset button 29b. The transition T4 corresponds to rebooting requested by the operating system 25a and occurs on detection of a blockage or dead-lock of the operating system, the detection being currently effected by a watchdog timer integrated into the microprocessor 23a. During the transitions T3 and T4, the cause of the rebooting is stored in the register 29c of the microprocessor 23a of the board 11.

In a step S1, the four transitions T1–T4 operate a zero reset of the service processor 23a of the board 11. In addition, the transition T2 operates a zero reset of the other processors of the platform 10. These transitions may last differently. Only the case of the management board 11 will be considered hereinafter.

At the start of initialisation, the service processor 23a then the memory means 24a are initialised during a step S2. A test, during a step S3, makes it possible to determine what was the last transition, in order to carry out initialisation adapted to the transition detected. This test uses a signature as reference. In the example selected, the signature of the test is based on the supply status control signals 31 which have been stored in the ports included in the block 33 and which are detected in the course of the test of step S2. During a cold reset (transition T2), all the supply status control signals 31 are currently brought to the logic state 1, corresponding to the value F in hexadecimal logic. The test of step S3 therefore verifies whether all the states have the value F. If so, there are still two solutions, which are determined during a step S4, depending on whether the logic value of the output potential V1 of the detector 37 is 0 or 1. During the test of step S4, if V1=0, a step S5 signifies that it is in fact a cold reset (transition T2). It has been seen that this transition leads to a step S6 of initialisation of the block 33 and of the signature at the value F. If V1=1, the detector 37 signals in a step S7 that a hot swap has been carried out and the test of step S4 indicates that it corresponds to a cold reset, thus signifying in practice that the board 11 which has been hot swapped did not function (invalid board). This case, rare but possible, can be detected by means of the method of the invention according to the example selected. In the two cases resulting from the test S4, the supply status control signals 31 are initialised at their operational values, which are determined by the microprocessor 23a and may be different from F.

Returning to the test of step S3, the presence of at least one logic value at 0 in the signature indicates that the reset is other than a cold reset and that the warm reset may be due to a transition T1, T3 or T4. For example, it was seen above that the block 33 remains energised during the hot swap of the board 11, so that the states have been changed by the microprocessor 23a in order to have the selected configuration in a given period. During a transition T3 or T4, generally very brief, the values which the states had during the interruption of the functioning of the platform 10 may still be detected during the initialisation which follows. A test during a step S8 makes it possible to distinguish the transitions T1, T3 and T4, depending on the logic value of the output signal V1 of the detector 37. If V1=0, a step S9 indicates that a transition T2 representing a cold reset was followed by a transition T3 or T4. If V1=1, a step S10 indicates that a transition T1 has been produced for the hot swap of the board 11, followed or not by a transition T3 or T4.

According to the method shown in FIG. 5, the steps S6, S7, S9 and S10 converge towards a step S11 comprising a test still based on the value of V1. If V1=1, the test indicates in a step S12 that the transition corresponds to a warm reset (transition T1, T3 or T4). If V1=0, it is a cold reset which can be followed, as seen in step S9, by warm rebooting due to a transition T3 or T4. To distinguish these two cases, a test during a step S13 verifies whether the content REG of the register 29c is empty (logic state 0) or not (logic state 1). If REG=1, a warm rebooting has followed a cold reset, so that the step S13 leads to the step S12. If REG=0, the test ensures, during a step S14, that only a transition T2 has been produced. In this case, the supply status control signals 31 of the secondary operating converter 17 are initialised during a step S15 and the cooling of the platform starts up during a step S16. The step S16 leads to the start of a step S17 which follows the step S12 relating to a warm reset. The step S17 resets the regulations of the process, thus resetting the cooling to normal mode if it had been put into degraded mode. The step S17 leads to a step S18 of logic connection of the management board 11 in the platform 10 and to any other possible management boards in the platform or system 10. Then, in a step S19, occurs the reset of the dialogue between the management board 11 and the managed board 12b. In the course of this reset are configured the software links between the operating system 25a of the board 11 and the software, known under the abbreviation BIOS (Basic Input Ouput System) and the operating system 25b of the operating board 12b. A process of dialogue between the board 11 and the administration processor 28 in a step S20 terminates the method of initialisation of the board 11 in the platform 10. At that moment, a few seconds after the hot swap, the board 11 is operational for managing the platform 10 again. The messages, such as the supply status signals 32 which could have been exchanged with its environment during the period of unavailability of the board, may be stored in buffer memories of the block 33 to serve at the moment of re-initialisation.

From the foregoing it transpires that the simple and advantageous adaptation of the invention to the hot swap of the management board 11 of a large information technology system 10 is due in particular to the use of the transient signals 41 and 42 detected during the hot swap of the board for generating a binary logic state (V1=1) representing the hot swap of the board. This stable state may therefore serve to render the board 11 reliably operational in the system 10 while maintaining the functioning of the rest of the system. The stability of this state may last only for the initialisation of the board. This feature of the invention may obviously serve for types of electronic cards other than a management board of a large system, the board 12b for example. Although this feature is used for the initialisation of a board with microprocessor, it becomes obvious from the description of the example illustrated that it could just as well serve to render any electronic card operational.

In general terms, the subject of the invention is therefore a method of management of the hot insertion of an electronic card 11 in a system 10, comprising the successive connection of the card to two supply potentials U0, U1 available in a connector 20 so as to obtain transient connection signals 41, 42, during the hot swap of the card, the detection of the transient signals for providing a binary signal V1, one binary state 1 of which represents the hot swap of the card, and the use of this binary state for rendering the card operational in the system.

In the example illustrated, the successive connection is effected by pins 21b–21d of different lengths, mounted on the board to enter corresponding contacts 22. However, it is obvious that the reverse structure would also produce successive connection and that other embodiments are possible. The option described and illustrated for successive connection may therefore be generalised by stating that the successive connection of the board comprises the use of connection members of three different lengths 21b–21d, two of these, 21b, 21d being for connection to one of the two supply potentials and two 21c, 21d being intended for obtaining transient connection signals 41 and 42.

The detection of the transient signals for forming a binary logic state corresponding to the hot swap is obviously not limited to the example described and illustrated with reference to FIG. 2. The example selected has the advantage of being simple and efficacious. According to this example, the detection of the transient signal 41 takes place starting from a bistable logic circuit 40 fed during the connection of the board to the potentials U0 and U1, by generating an asymmetry (R7, R8, R9/R6, R10, R11; 39) adjustable depending on the presence or otherwise of the transient signals, for initialising the bistable logic circuit in a first logic state V1=0 when the board is mounted on the connector during a cold reset of the board and in the second logic state V1=1 in response to the transient signals during the hot swap of the board.

In the case where the board incorporates at least one microprocessor 23a, it has been seen that the state of the binary signal (V1) may serve for the initialisation of the functions of the board by means of the microprocessor. In the example illustrated, this type of board provides the management of at least a part of the system 10 and determines, by control signals 31, supply states in the said part of the system. The method illustrated comprises, prior to the hot swap of the board 11, the storage in the block 33, external to the board 11, of the supply status control signals 31.

In the example described and illustrated, the initialisation of the board comprises the detection of at least a part of the supply status control signals 31 and the comparison with predetermined values FFFF . . . of the supply states for the determination of a signature representing the cold reset or the hot swap of the board in the system. However, it is obvious that other types of signatures may be involved in order to render the board operational. Moreover, a signature is not necessary but may prove very advantageous, as in the example illustrated. More generally, the use of the binary state of the binary signal V1 may therefore include the determination of a signature representing the cold reset or the hot swap of the board in the system.

A further subject of the invention is a detector 37 for detecting the hot insertion of an electronic card 11 in a system 10, comprising: means 21b–21d for successive connection of the card to two supply potentials U0, U1 available in a connector 20 so as to obtain transient connection signals 41, 42 during the hot insertion of the card; and a bistable logic circuit 40 fed during the connection of the card to the potentials U0, U1 and provided with biasing means 39 adjustable depending on the presence or otherwise of the transient signals, for initialising the bistable logic circuit in a first logic state V1=0 when the card is mounted on the connector during a cold reset of the card and in the second logic state V1=1 in response to the transient signals during the hot insertion of the board.

According to the option selected, the bistable logic circuit 40 has a predetermined asymmetry R7, R8, R9/R6, R10, R11 and the adjustable biasing means 39 maintain the predetermined asymmetry during a cold reset of the card. In the example illustrated, the resistive divider bridge R2/R3 effects the blocking of the transistor Q1 associated with the transistor Q2 which, in the bistable logic circuit 40, is predetermined to be conductive, in accordance with the predetermined state of asymmetry. According to the additional option selected, the adjustable biasing means 39 react to the transient signals 41, 42 to inhibit the predetermined asymmetry and create a reverse asymmetry to that predetermined. Other options are possible. According to the example illustrated, the main conduction path of the transistor Q1 is parallel to a polarisation branch (formed by the resistor R9) of the transistor Q3. Thus, the transient connection signals trigger the conduction of the transistor Q1 and consequently block the conduction of the transistor Q2. This blockage therefore inhibits the predetermined asymmetry and creates a reverse asymmetry which causes the transistor Q3 to conduct and generates the state V1=1 representing the hot insertion of the card 11.

In practice, the hot insertion detector may be integrated at very little cost in a conventional zero reset circuit for a microprocessor, or a circuit dedicated to the switching of the power supply of a hot-insertable board.

A corollary subject of the invention is an electronic card 11 comprising means 20b, 21b–21d for connection of the card to two supply potentials U0, U1 external to the card and means 29, 37 for the hot insertion of the card in a system which have functions defined by the method of the invention or comprise a hot insertion detector as defined previously.

A further corollary subject of the invention is a system 10 in which at least one card 11 can be hot inserted and which implements the method of the invention.

What is claimed is:

1. A method of management of the hot insertion of an electronic card in a system, said method comprising:

connecting said electronic card to two voltage supply potentials available in a connector so as to obtain transient connection signals during the hot insertion of said electronic card, detecting said transient connection signals and providing a binary signal in response thereto, said binary signal having, a first binary state (V1=1) which represents the hot insertion of said electronic card, and using said first binary state of said binary signal for rendering said electronic card operative in said system, wherein detecting said transient connection signals is effected starting from a bistable logic circuit fed during the connecting of said electronic card to said supply voltage potentials, so as to generate an adjustable asymmetry depending on the presence or absence of said transient connection signals, and thus initializing said bistable logic circuit to a first logic state (V1=1) in response to said transient connection signals during the hot insertion of said electronic card and to a second logic state (V1=0) when said electronic card is already mounted on said connector during a cold reset of said electronic card.

2. The method according to claim 1, further comprising successive connection of said electronic card to the two voltage supply potentials using connection members of three different lengths, two of said connection members being for connection to one of said two voltage supply potentials and two of said connection members being adapted for obtaining said transient connection signals.

3. The method according to claim 1, wherein said electronic card incorporates at least one microprocessor and the use of said first binary state of said binary signal comprises initialization of the functions of said electronic card by means of said microprocessor.

4. The method according to claim 3, wherein said electronic card provides for the management of at least a part of said system and determines, through control signals, supply status in the system, said method comprising, prior to the hot insertion of said electronic card, an external storage of said control signals for supply status.

5. The method according to claim 3, wherein the use of the binary state of said binary signal includes computing a signature representing the cold reset or the hot insertion of said electronic card in said system.

6. The method according to claim 4, wherein the initialization of said electronic card comprises detecting at least a apart of said control signals for supply status and comparing said supply status with predetermined values for computing a signature representing the cold reset or hot insertion of said electronic card in said system.

7. A detector for detecting the hot insertion of an electronic card in a system, wherein said detector comprises means for successive connection of said electronic card to two supply voltage potentials available in a connector so as to obtain transient connection signals during the hot insertion of said electronic card, a bistable logic circuit fed during the connection of said electronic card to said voltage potentials and provided with adjustable biasing means depending on the presence absence of said transient connection signals, for initializing said bistable logic circuit in a first logic state (V1=1) in response to said transient connection signals during the hot insertion of said electronic card and in a second logic state (V1=0) when said electronic card is mounted on said connector during a cold reset of said electronic card.

8. The detector according to claim 7, wherein said bistable logic circuit has a predetermined asymmetry said adjustable biasing means maintaining said predetermined asymmetry during a cold reset of said electronic card.

9. The detector according to claim 8, wherein said adjustable biasing means react to said transient connection signals to inhibit said predetermined asymmetry and create a reverse asymmetry to said predetermined asymmetry.

10. An electronic card comprising means for connection of said electronic card to two supply voltage potentials external to said electronic card and means for hot insertion of said electronic card in a system, wherein said means for the hot insertion comprise a hot insertion detector, said detector comprising means for successive connection of said electronic card to two voltage supply potentials available in a connector so as to obtain transient connection signals during the hot insertion of said electronic card and a bistable logic circuit fed during the connection of said electronic card to said supply voltage potentials and provided with adjustable biasing means depending on the presence or absence of said transient connection signals, for initializing said bistable logic circuit in a first logic state (V1=1) in response to said transient connection signals during the hot insertion of said electronic card and in a second logic state (V1=0) when said electronic card is mounted on said connector during a cold reset of said electronic card.

* * * * *